United States Patent
Kawai et al.

(10) Patent No.: US 8,358,904 B2
(45) Date of Patent: Jan. 22, 2013

(54) IMAGE SIGNAL RECORDING APPARATUS, METHOD OF STRUCTURING PREFERENCE INFORMATION FOR RECORDING APPARATUS AND NETWORK SYSTEM OF RECORDING APPARATUS

(75) Inventors: Noriaki Kawai, Fussa (JP); Takahisa Kaihotsu, Musashino (JP)

(73) Assignee: Kabushiki Kaisha Toshiba (JP)

( * ) Notice: Subject to any disclaimer, the term of this patent is extended or adjusted under 35 U.S.C. 154(b) by 415 days.

(21) Appl. No.: 12/497,407

(22) Filed: Jul. 2, 2009

(65) Prior Publication Data

US 2010/0034511 A1 Feb. 11, 2010

(30) Foreign Application Priority Data

Aug. 11, 2008 (JP) .................................. 2008-207037

(51) Int. Cl.
*H04N 5/77* (2006.01)
(52) U.S. Cl. ........................................ 386/225; 386/223
(58) Field of Classification Search .................... 386/225
See application file for complete search history.

(56) References Cited

U.S. PATENT DOCUMENTS

| | | | |
|---|---|---|---|
| 6,654,135 B2 * | 11/2003 | Mitani | 358/1.15 |
| 7,631,331 B2 * | 12/2009 | Sie et al. | 725/46 |
| 2003/0066067 A1 | 4/2003 | Gutta et al. | |
| 2004/0190183 A1 * | 9/2004 | Tamai et al. | 360/69 |
| 2005/0081043 A1 | 4/2005 | Evans et al. | |
| 2008/0170836 A1 | 7/2008 | Kinoshita et al. | |

FOREIGN PATENT DOCUMENTS

| | | |
|---|---|---|
| JP | 2001-273326 | 10/2001 |
| JP | 2003-179950 | 6/2003 |
| JP | 2004-355109 | 12/2004 |
| JP | 2005-504399 | 2/2005 |
| JP | 2005-080012 | 3/2005 |
| JP | 2005-223846 | 8/2005 |
| JP | 2007-282043 | 10/2007 |
| JP | 2007-318364 | 12/2007 |
| JP | 2008-011428 | 1/2008 |
| JP | 2008-172621 | 7/2008 |
| WO | WO 2003/030027 | 4/2003 |

OTHER PUBLICATIONS

Notice of Reasons for Rejection mailed by Japan Patent Office on Oct. 6, 2009 in the corresponding Japanese patent application No. 2008-207037.
Explanation of Non-English Language Reference(s).

* cited by examiner

*Primary Examiner* — Jamie Atala
(74) *Attorney, Agent, or Firm* — Knobbe, Martens, Olson & Bear LLP (57) ABSTRACT

According to one embodiment of the present invention is applied to an apparatus which performs automatic recording based on a timer recording list. A transmitting/receiving module is connected to a network. Preference information retrieved from another recording apparatus via the transmitting/receiving module is once set directly in a first storage module. A second storage module saves a timer recording list in which the preference information in the first storage module is reflected. As a result, the preference information retrieved from the other recording apparatus is once set directly in the first storage module, and the preference information in the first storage module is reflected in the timer recording list.

8 Claims, 7 Drawing Sheets

F I G. 1

| Category item | Preference point |
|---|---|
| News | 150 |
| Sports | 210 |
| Movie | 310 |
| …… | …… |

FIG. 2A

| Keyword | Preference point |
|---|---|
| Baseball | 150 |
| Enka (Japanese popular ballad) | 210 |
| Soccer | 50 |
| …… | …… |

FIG. 2B

| Performer item | Preference point |
|---|---|
| Talent A | 310 |
| Talent B | 150 |
| Talent C | 30 |
| …… | …… |

| Category item | Preference point |
|---|---|
| News | 100 |
| Movie | 200 |

FIG. 5B

| Category item | Preference point |
|---|---|
| News | 150 |
| Sports | 400 |

| Category item | Preference point |
|---|---|
| News | 120 |
| Sports | 120 |
| Movie | 160 |

IMAGE SIGNAL RECORDING APPARATUS, METHOD OF STRUCTURING PREFERENCE INFORMATION FOR RECORDING APPARATUS AND NETWORK SYSTEM OF RECORDING APPARATUS

CROSS-REFERENCE TO RELATED APPLICATIONS

This application is based upon and claims the benefit of priority from Japanese Patent Application No. 2008-207037, filed Aug. 11, 2008, the entire contents of which are incorporated herein by reference.

BACKGROUND

1. Field

One embodiment of the invention relates to an image signal recording apparatus, a method of structuring preference information for the recording apparatus and a network system of the recording apparatus.

2. Description of the Related Art

In recording apparatuses, a timer recording list is structured in a storage medium in advance, so that automatic recording is realized. The timer recording list is structured in the following manner. Program list data is created from received electronic program guide information (so-called EPG information). The program list data is displayed on a display module in response to a user's operation. In a timer recording mode, a user operates a remote controller to specify and determine desired timer recording programs from the program list displayed on the display module with a cursor. With such an operation, the timer recording list is structured.

A technique in which when the timer recording list is structured, user's preference information is also reflected has been developed (for example, Jpn. Pat. Appln. KOKAI Publication No. 2004-355109). Further, a technique which structures preference information using electronic program guide information has also been developed (for example, Jpn. Pat. Appln. KOKAI Publication No. 2005-504399). In this technique, a self profile and the other person's profile are used.

In any case, a database of preference information is structured by a user consistently, when a recording apparatus is new and the initial state.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings.

One embodiment of the present invention provides a recording apparatus, a method of structuring preference information about the recording apparatus and a network system of the recording apparatus which simplify user's operations when timer recording information in which preference information is reflected is acquired.

The embodiment provides a recording apparatus which acquires timer recording information in which user's original preference information is reflected, the method of structuring preference information for the recording apparatus and the network system of the recording apparatus.

The embodiment is applied to an apparatus which performs automatic recording based on a timer recording list. A receiving/transmitting module is connected to a network. In a first storage module (preference information database), preference information retrieved from another recording apparatus via the transmitting/receiving module is once set. A second storage module saves the timer recording list in which preference information of the first storage module is reflected.

As a result, the preference information retrieved from another recording apparatus is once set in the first storage module, and the preference information in the first storage module is reflected in the timer recording list.

As a result, even in a recording apparatus which is newly purchased or replaced, preference information is reflected in a timer recording list without performing any user's operation for structuring preference information consistently.

Figure 1:
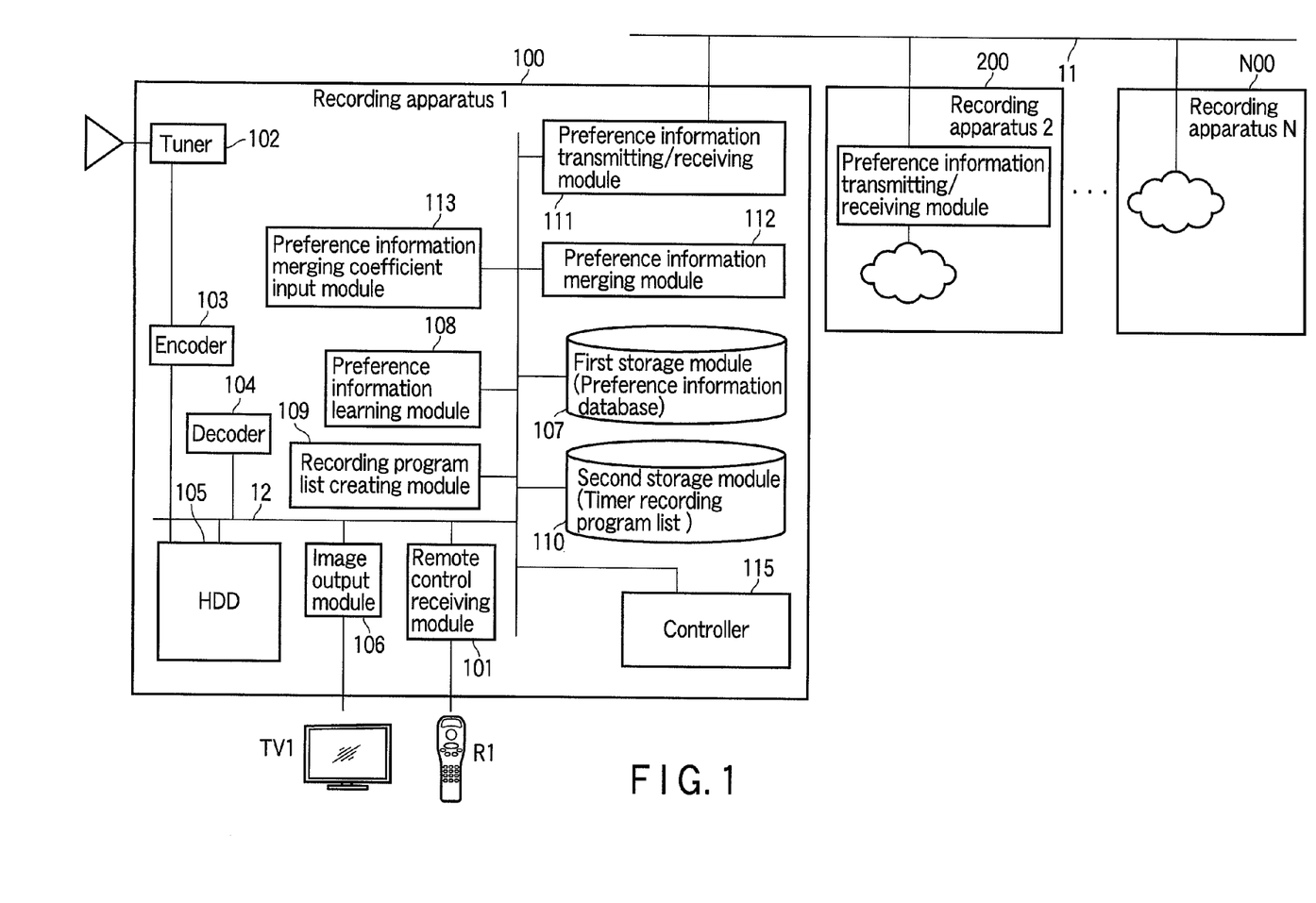
FIG. 1 is an explanatory diagram illustrating a structural example and a usage example of a recording apparatus according to the present invention.

The embodiment of the present invention will be described in more detail below with reference to the drawings. FIG. 1 illustrates a use example of the recording apparatus to which the present invention is applied. Reference numeral 11 denotes a network as domestic transmission means. The network 11 is connected to a plurality of recording apparatuses 100-N00.

FIG. 1 representatively illustrates an internal configuration of the recording apparatus 100, and the other recording apparatuses 200-N00 have the same configuration. The basic configuration of the recording apparatus 100 will be described.

A broadcasting signal from an antenna is input into a tuner 102. The tuner 102 includes a channel selector, a demodulating module, and a digital image and audio signal processing module. A receiving channel of the tuner 102 and a program are selected based on a user's operation, and based on timer recording list information from a second storage module 110, described later.

At a timer program broadcasting time, the tuner 102 receives a timer program. A program signal output from the tuner 102 is input into an encoder 103, and is compressed according to an MPEG system or the like. The encoder 103 converts the compressed signal into a predetermined format, and the converted signal is supplied to a hard disc drive (HDD) 105 via a bus 12.

An image output module 106 is connected to the bus 12. The signal read from the hard disc drive 105 is decoded by a decoder 104. An image/audio signal output from the decoder 104 is supplied to a television receiving apparatus TV1 via the image output module 106.

A remote control signal receiving module (hereinafter, remote control receiving module) 101 is connected to the bus 12. The remote control receiving module 101 receives an operation signal from a remote control device R1, and transmits it to a controller 115. The operation signal may be input from another user interface such as a keyboard.

The controller 115 analyzes the operation signal and reflects operating contents throughout the entire operation of the recording apparatus 100. The second storage module 110 is connected to the bus 12. The timer recording list is created by a recording program list creating module 109. The recording program list creating module 109 creates a program list using program information about timer recording set by a user's operation, and creates a program list in which contents of a preference information database in the first storage module 107 are reflected.

Figure 2A:
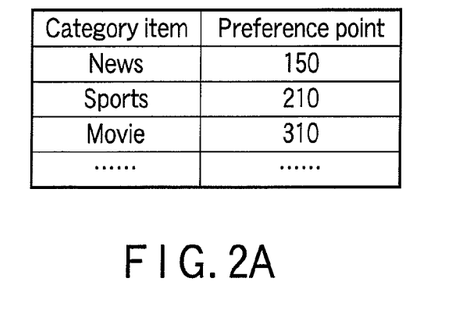
FIGS. 2A to 2C are explanatory diagrams illustrating examples of a data format of a preference information database.
Figure 2B:
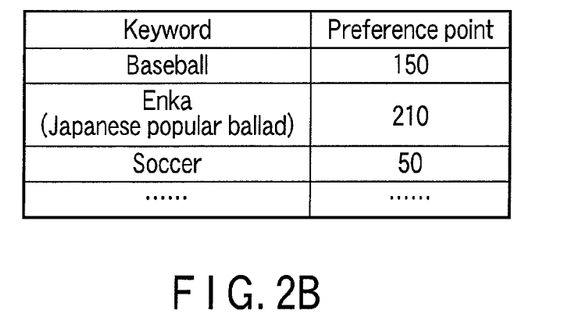
Figure 2C:
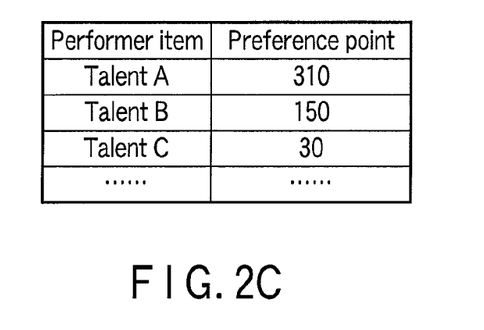

The preference information database is preference information about a data structure shown in FIGS. 2A to 2C. In an example of FIG. 2A, items are classified according to categories, and preference points are added to the categories. In an example of FIG. 2B, items are classified according to keywords, and preference points are added to the keywords. In an example of FIG. 2C, items are classified according to performers, and preference points are added to the performers.

The preference information database is structured by a preference information learning module 108, for example. The preference information learning module 108 adds preference points to the respective items based on the program information selected by the user, viewing time of the selected program information, reserved program information and information about viewing times. The user's preference can be estimated by the value of the preference point. Any one of the types shown in FIGS. 2A to 2C may be used as the preference information database, or a plurality of types may be combined. When the user performs timer recording or views a recorded program or erases the recorded program without viewing the program, the preference information learning module 108 updates the preference information database.

In this embodiment, the preference information learning module 108 is characterized in that a database in the first storage module 107 can be reset using the information in a preference information merging module 112. Preference information from an external recording apparatus can be set directly. This processing function is effectively utilized when the recording apparatus is newly purchased, namely, the preference information database is not yet structured.

A preference information transmitting/receiving module 111 which transmits/receives information to/from the external recording apparatus is connected to the bus 12. External preference information retrieved from the preference information transmitting/receiving module 111 is merged with internal preference information in the preference information merging module 112. At this merging, a coefficient for merging preference information is used. The coefficient for merging preference information can be arbitrarily set by a user under the control of the a merging coefficient input module 113 (this operation will be described in more detail below).

Figure 3:
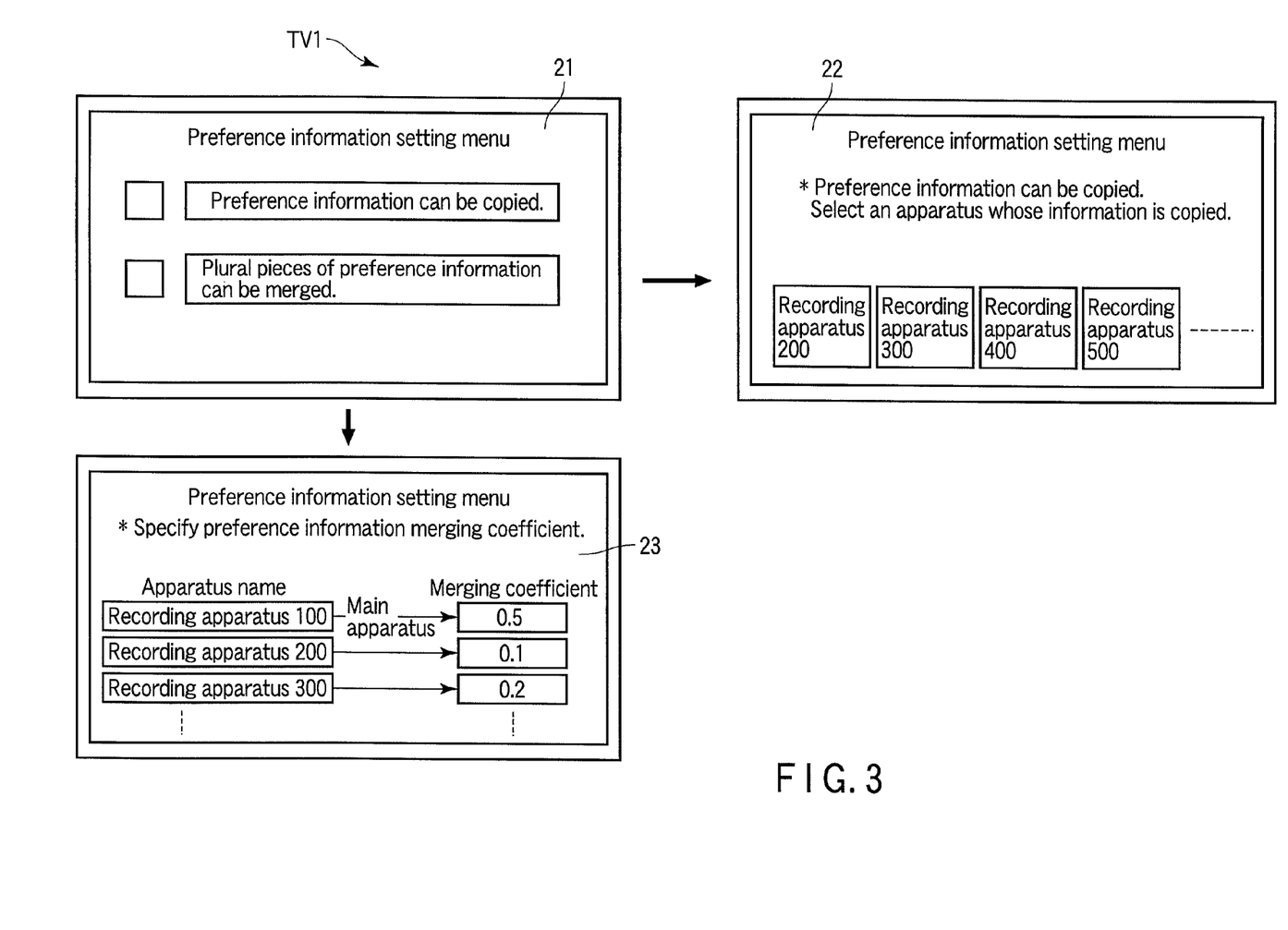
FIG. 3 is a diagram illustrating examples of a guide image at the time of copying or merging preference information.

FIG. 3 illustrates an example of a screen explaining an operational example at the time of copying preference information or merging preference information. When the user presses a menu button of a remote control operating device R1, a menu is displayed on the television receiving apparatus TV1. An item of a preference information setting menu is displayed in a menu item. When the user operates the remote control operating device R1 and presses a determination button with a cursor being on the item of the preference information setting menu, a guide image 21 shown in FIG. 3 is displayed. "Preference information can be copied" or "Plural pieces of preference information can be merged" is displayed on the guide image 21.

When the user selects and determines the item "Preference information can be copied", a guide image 22 is displayed. An identification of the external recording apparatus connected to the network is displayed. In this display example, since the recording apparatus used currently is No. 1 (100), the other recording apparatuses 200, 300, 400 . . . are shown as alternatives (guide image 23). When the user selects and determines the desired recording apparatus, the preference information database of the first storage module in the recording apparatus is transmitted. The received preference information database is stored in the first storage module 107 in the recording apparatus No. 1 used currently. At this time, the user of the recording apparatus 100 does not have to structure preference information consistently from the beginning, and can effectively utilize the already structured database.

On the other hand, when the item "Plural pieces of preference information can be merged" is selected and determined on the guide screen 21, the guide screen 23 is displayed.

A merging coefficient input module for the recording apparatuses 100, 200, 300, . . . connected via the network is displayed on the guide screen 23. The merging coefficient is set in order to determine how much a preference point of a certain recording apparatus is weighted. In an example of FIG. 3, the merging coefficient of the recording apparatus 100 is 0.5, the merging coefficient of the recording apparatus 200 is 0.1, and the merging coefficient of the recording apparatus 300 is 0.2.

Figure 4:
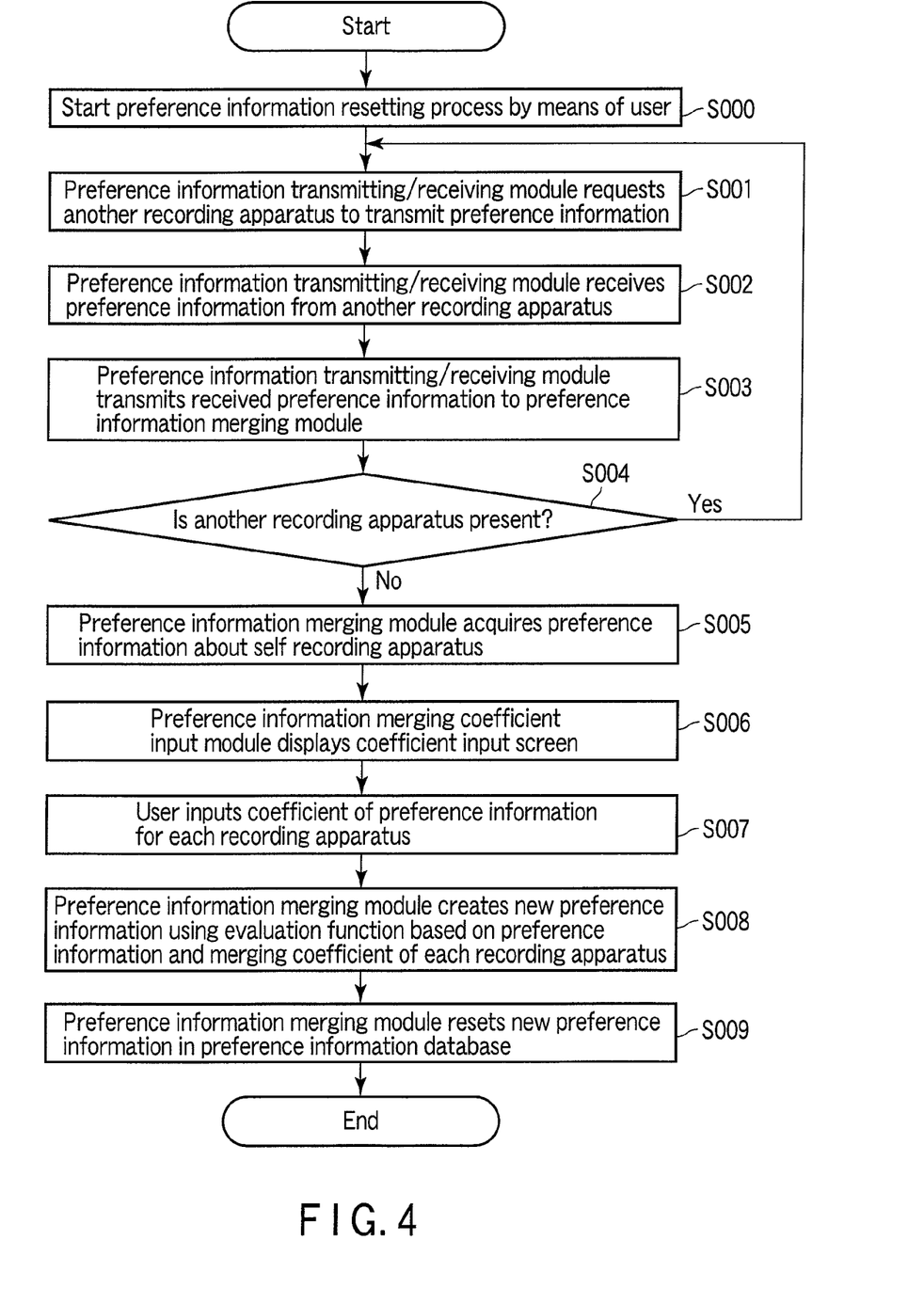
FIG. 4 is a flow chart illustrating an operational example at the time when the apparatus of the present invention merges the preference information.

FIG. 4 is a flow chart illustrating an operational example at the time of merging the plural pieces of preference information. When the user starts a preference information resetting process (step S000: selection of "Plural pieces of preference information can be merged" on the image 21 of FIG. 3), the preference information transmitting/receiving module requests another recording apparatus to transmit preference information (step S001).

The preference information transmitting/receiving module 111 receives the preference information about another recording apparatus, and transmits the received preference information to the preference information merging module 112 (steps S002 and S003). A determination is made as to whether another recording apparatus is connected to the network (step S004). When another recording apparatus is connected to the network, preference information about the recording apparatus is retrieved. When the preference information about all the recording apparatuses on the network is retrieved, the preference information merging module 112 acquires preference information in the recording apparatus 100 (step S005).

As shown in FIG. 3, a preference information merging coefficient input image 23 is displayed based on the operation of the merging coefficient input module 113 (step S006). The user inputs merging coefficients for the respective recording apparatuses. When the determination button is operated after the merging coefficients are input, the preference information merging module 112 executes an evaluation function to create new preference information using the preference information and the merging coefficients of the recording apparatuses (steps S007 and S008). The preference information merging module 112 sets new preference information in the preference information database (step S009).

FIGS. 5A and 5B to 7 are diagrams explaining an operation at the time of merging preference information. The example in which preference information about the recording apparatuses 100 and 200 is merged will be described.

Figure 5A:
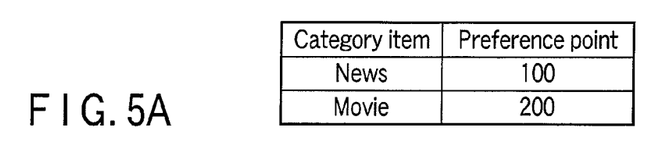
FIGS. 5A and 5B are diagrams illustrating examples of the preference information to be used when the apparatus of the present invention merges the preference information.
Figure 5B:
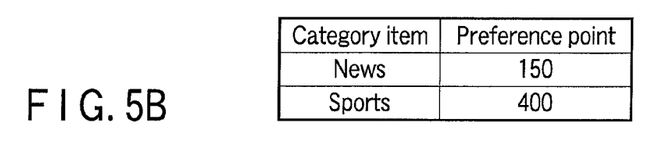

FIG. 5A illustrates the preference information about the recording apparatus 100, and 100 is set as the preference point of a news program, and 200 is set as the preference point of a movie program. On the other hand, in the preference information about the recording apparatus 200, as shown in FIG. 5B, 150 is set as the preference point of a news program, and 400 is set as the preference point of sports. The preference information is reset in the recording apparatus 100. As a type of preference information in this embodiment, only a category is described. The same process is executed for another type of preference information.

Figure 6:
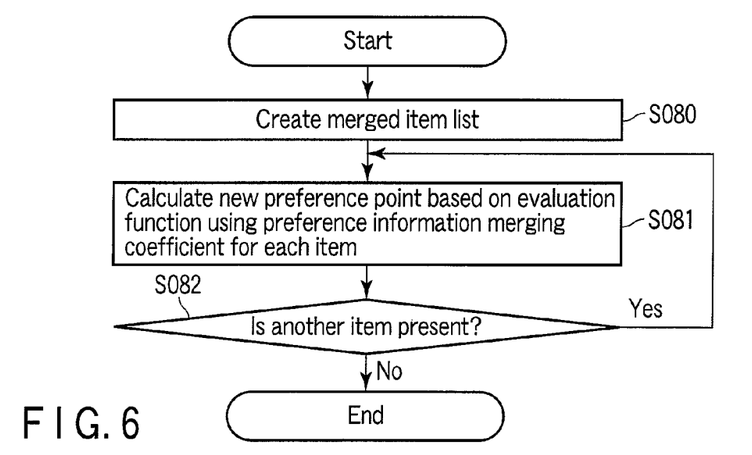
FIG. 6 is a flow chart illustrating a process for creating a merging item list in the apparatus according to the present invention.
Figure 7:
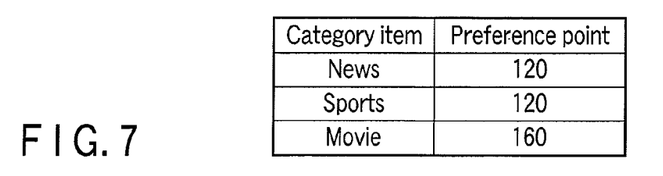
FIG. 7 is a diagram illustrating an example of new preference information created by the apparatus of the present invention.

When the preference information is merged, as shown in FIG. 6, item lists of the respective apparatuses are checked before merging, and then merging item lists are created (step S080). In the above example, the merging item list includes "news", "sports" and "movie" as shown in FIG. 7. As shown in FIG. 6, an evaluation function is calculated by using preference information merging coefficients for the respective items. Then, the preference points of the respective items are calculated (steps S081 and S082).

Assume that the preference information merging coefficient which is multiplied by the preference information point of the recording apparatus 100 is 0.6, and the coefficient which is multiplied by the preference information about the recording apparatus 200 is 0.4. New preference points of the respective items are calculated as follows:

New preference point=preference point of the recording apparatus 100×preference information merging coefficient relating to the recording apparatus 200+preference point of the recording apparatus 200×preference information merging coefficient relating to the recording apparatus 200.

For example, in the case of news under the above condition,
New preference point=100×0.6+150×0.4=120
In the case of a movie under the above condition,
New preference point=200×0.6+0×0.4=120
When another item is present, the sequence returns to step S081. In the case of the above condition, when the preference points for news, movie and sports are calculated, the process is ended.

When the above flow process is ended, new preference information is created as shown in FIG. 7. The created new preference information is reset in the preference information database in the module 107 by the preference information merging module 112.

The present invention is not limited to the above embodiment. In the above embodiment, when preference information is merged, preference information about all the recording apparatuses connected to the network is acquired. However, the recording apparatuses may have a function which can prevent transmission of a preference information database.

For example, when the recording apparatus 200 refuses to transmit the preference information database to the recording apparatus 100, the recording apparatus 100 stops a request to the recording apparatus 200 and requests the recording apparatus 300 to transmit preference information. That is, the recording apparatus 100 has a skipping function.

The above description refers to the case where the merging of the preference information about another recording apparatus is started by a user's operation. However, the merging may be started when the preference information learning module 108 of any one of the recording apparatuses connected to the network updates the preference information database. A status as to whether the preference information database of an external recording apparatus is updated can be determined by, for example, periodically exchanging warning information indicating whether the updating is carried out together with a device ID.

The case where the preference information database is updated includes a case where timer recording is performed by a user's operation, a case where a recorded program is actually viewed, and a case where a recorded program is not viewed but erased.

In such cases, the recording apparatus automatically retrieves preference information from an external recording apparatus so as to execute the merging process. In this case, the merging coefficient is assumed as already being input, via reference to the menu screen. Alternatively, a merging coefficient which was used the previous time may be reused.

Figure 8:
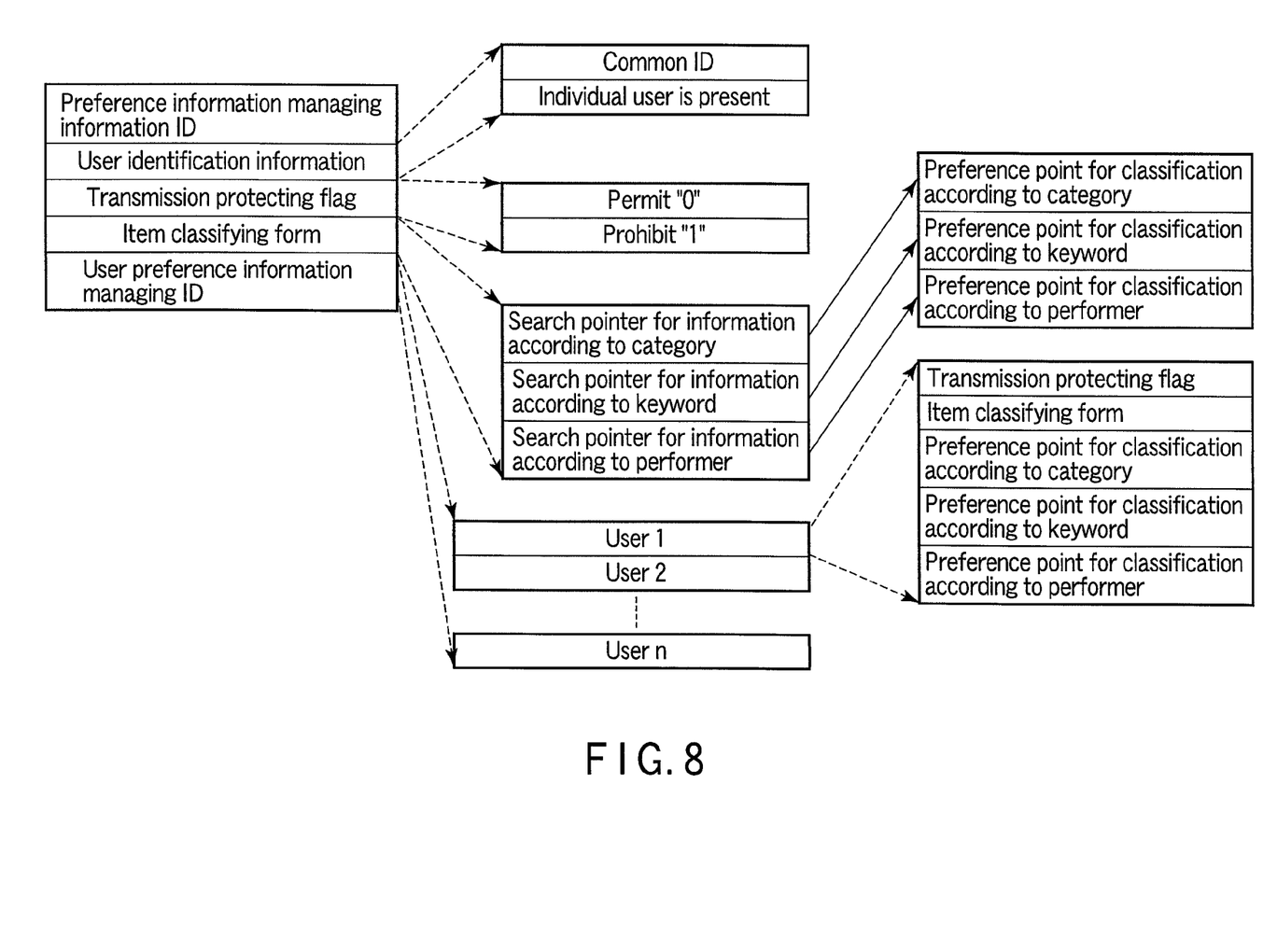
FIG. 8 is an explanatory diagram illustrating an example of preference information managing information to be used in the apparatus of the present invention.

FIG. 8 illustrates one example of preference information managing information for managing preference information. The preference information managing information has a preference information managing information ID, which is stored in the controller 115 or a storage area of the first storage module 107. The preference information managing information further includes user identification information, a transmission protecting flag, and an item classifying state.

The user identification information is used for identifying whether the managing information is commonly used regardless of users, or the managing information is used for a plurality of users. The above describes that the managing information is used commonly regardless of user.

The transmission protecting flag is information representing whether the transmission of the preference information database in the apparatus is permitted or prohibited. When a prohibiting flag is described, even if transmission is requested from another recording apparatus, the preference information database is not transmitted.

Further, the managing information may include managing information representing an item classifying state. That is, the managing information is information representative of which of a category, keyword and performer the preference information database (preference point) is classified. When the preference information databases are classified according to the category, a search pointer for classifying the category is exists, which indicates the location of the category-based preference information. In this case, the other search pointers for information according to keywords and performers are set to be invalid, i.e., as "FFFF".

The managing information may include preference information managing IDs for respective users. That is, when a plurality of users use one recording apparatus, the preference information managing IDs for users enable preference information about each user to be managed. When a user uses this recording apparatus, the user operates the remote control operating device R1 so as to input user identification information. As a result, preference information is classified according to the users to be managed. Also, when the preference information is managed for each user, as shown in FIG. 3, the merging coefficient for each user can be input.

Figure 9:
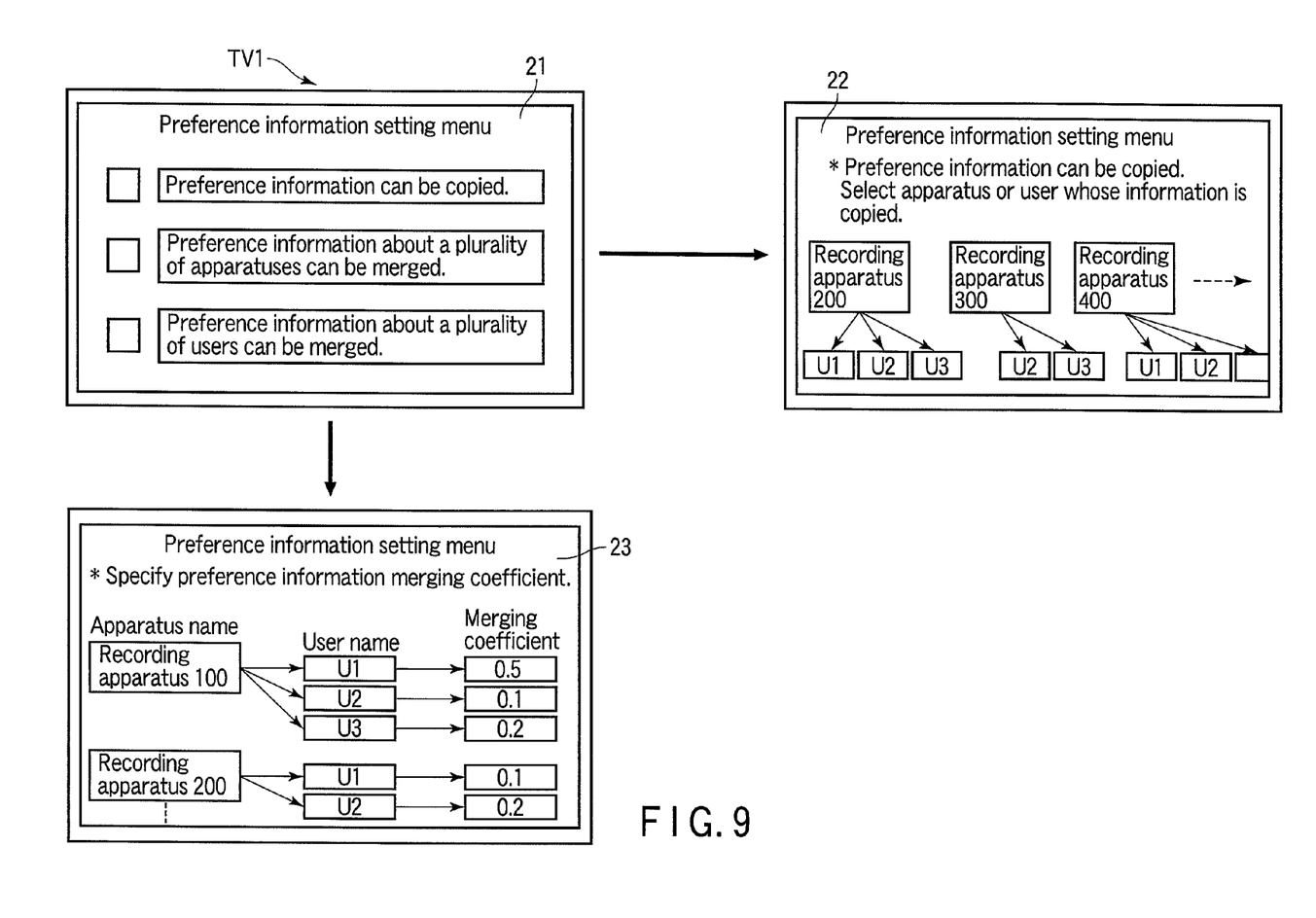
FIG. 9 is a diagram illustrating an example of a guide image shown for explaining another embodiment of the apparatus of the present invention.

FIG. 9 illustrates an example of an image to be displayed at the time of setting the merging coefficient for each user. On the image 21, when an item where the merging coefficient for each user is set is selected and a determination button is pressed, an image 23 appears. The merging coefficient input modules of the users 1, 2 and 3 set in the recording apparatus 100 are displayed on the image 23. In the drawing, the merging coefficient input modules of the users 1 and 2 set in the recording apparatus 100 are displayed. When information relating to users set in the other recording apparatuses is desired to be viewed, a cursor key may be operated so that the information appears on a lower part of the screen. The user names are shown as U1 and U2 for simplification, but the user names may be input directly by using the Western alphabet, Hiragana or Katakana.

The image 22 is an image which is referred to when a user makes a selection in the case where user's preference information is directly copied. A desired user portion is specified by the cursor button and a determining operation is performed so that the specified user's preference information can be retrieved. When the user sets a copy prohibiting flag, the copying is disabled.

According to the present invention, the following recording apparatus can be provided. With this recording apparatus, preference information about another recording apparatus can be directly copied, and when timer recording list (timer recording program information) in which the preference information is reflected is acquired, a user's operation is facilitated. According to the present invention, merging coefficients can be set for respective apparatuses and respective users. For this reason, timer recording information in which user's original preference information is reflected can be acquired. The preference information included in the timer recording information is used for priority selecting a reservation recording program between a plural reservation recording programs, for example. When some reservations for programs are partially or whole over lapped, the preference information is referred to determine a priority reservation.

Preference information may be encrypted on a transmission side and decoded on a reception side. Further, preference information may be input by using a memory card (SD card).

While certain embodiments of the invention have been described, these embodiments have been presented by way of example only, and are not intended to limit the scope of the invention. Indeed, the novel methods and systems described herein may be embodied in a variety of forms; furthermore, various omissions, substitutions and changes in the form of the methods and systems described herein may be made without departing from the spirit of the invention. The accompanying claims and their equivalents are intended to cover such forms or modifications as would fall within the scope and spirit of the invention.

What is claimed is:

1. A recording apparatus configured to perform automatic video recording based on a timer recording program list, comprising:
   a transmitting and receiving module configured to connect to a network;
   a preference information database module configured to retrieve preference information from another recording apparatus via the transmitting and receiving module and store the retrieved preference information as it is;
   a preference information merging coefficient input module configured to apply a merging coefficient to the retrieved preference information;
   a preference information merging module configured to create new preference information by merging preference information pre-stored in the preference information database-module with the retrieved preference information to which the merging coefficient is applied; and
   a timer recording program list module configured to store the timer recording program list in which the new preference information in the preference information database module is associated with timer recording information.

2. A method of structuring preference information for a recording apparatus configured to perform automatic video recording based on a timer recording program list, the method comprising:
   retrieving preference information from another recording apparatus via a transmitting and receiving module connected to a network;
   setting the retrieved preference information as it is into a preference information database module;
   applying a merging coefficient to the retrieved preference information;
   creating new preference information by merging preference information pre-stored in the preference information database module with the retrieved preference information to which the merging coefficient is applied, and resetting the new preference information into the preference information database module; and
   associating the reset new preference information with the timer recording information, and storing the timer recording information into a timer recording program list module.

3. The recording apparatus of claim 1, wherein the preference information merging coefficient input module manages the retrieved preference information to each user corresponding to a destination from which preference information is retrieved, and enables the merging coefficient to be applied to the retrieved preference information.

4. The recording apparatus of claim 3, wherein the merging coefficient is set for each recording apparatus corresponding to a destination from which preference information is retrieved.

5. The recording apparatus of claim 4, wherein the preference information is information of a table including a plurality of classified items which are classified according to programs and preference points which are weighted according to viewing times of corresponding programs.

6. The method of claim 2, wherein the preference information is information of a table including a plurality of classified items which are classified according to programs and preference points which are weighted according to viewing times of corresponding programs.

7. The method of claim 6, further comprising:
   managing the retrieved preference information for each user corresponding to a destination from which information is retrieved, and enabling the merging coefficient to be applied to the retrieved preference information.

8. A network system comprising a plurality of recording apparatuses connected in parallel on a network and configured to perform automatic video recording based on a timer recording program list, each recording apparatus comprising:
   a transmitting and receiving module configured to connect to a network;
   a preference information database module configured to retrieve preference information from another recording apparatus via the transmitting and receiving module and store the retrieved preference information as it is;
   a preference information merging coefficient input module configured to apply a merging coefficient to the retrieved preference information;
   a preference information merging module configured to create new preference information by merging preference information pre-stored in the preference information database module with the retrieved preference information to which the merging coefficient is applied; and a timer recording program list module configured to store the timer recording program list in which the new preference information in the preference information database module is associated with timer recording information, wherein the preference information merging coefficient input module in the each recording apparatus manages the retrieved preference information to each user corresponding to a destination from which preference information is retrieved, and enables the merging coefficient to be applied to the retrieved preference information.

* * * * *